United States Patent
Teramoto et al.

(10) Patent No.: US 8,693,841 B2
(45) Date of Patent: Apr. 8, 2014

(54) VIDEO REPRODUCING APPARATUS, METHOD, AND COMPUTER READABLE MEDIUM

(75) Inventors: Keiichi Teramoto, Kawasaki (JP); Yosuke Tajika, Kobe (JP); Yoshiki Terashima, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1132 days.

(21) Appl. No.: 11/754,545

(22) Filed: May 29, 2007

(65) Prior Publication Data

US 2007/0280640 A1 Dec. 6, 2007

(30) Foreign Application Priority Data

May 30, 2006 (JP) .................... 2006-150316

(51) Int. Cl.
*H04N 5/775* (2006.01)

(52) U.S. Cl.
USPC .......................... 386/230; 386/219

(58) Field of Classification Search
None
See application file for complete search history.

(56) References Cited

U.S. PATENT DOCUMENTS

| 7,657,040 B2* | 2/2010 | Aiso et al. ............... 381/119 |
| 2003/0113096 A1* | 6/2003 | Taira et al. ............... 386/46 |
| 2004/0058648 A1* | 3/2004 | Layley et al. ............ 455/41.2 |
| 2006/0218189 A1 | 9/2006 | Terashima et al. |
| 2006/0271996 A1* | 11/2006 | Sato ........................ 725/135 |
| 2007/0053514 A1* | 3/2007 | Imai et al. ............... 380/204 |

FOREIGN PATENT DOCUMENTS

| JP | 11-85861 | 3/1999 |
| JP | 2001-333030 | 11/2001 |
| JP | 2005-50126 | 2/2005 |
| WO | WO 2006/025468 A1 | 3/2006 |

OTHER PUBLICATIONS

U.S. Appl. No. 11/608,960, filed Dec. 11, 2006, Yoshiki Terashima, et al.

* cited by examiner

*Primary Examiner* — Huy T Nguyen
*Assistant Examiner* — Eileen Adams
(74) *Attorney, Agent, or Firm* — Oblon, Spivak, McClelland, Maier & Neustadt, L.L.P.

(57) ABSTRACT

There is provided with a video reproducing apparatus, including: an access unit configured to access a storage medium holding a plurality of video scenes; an external device search unit configured to search for an external device which can communicate; a scene selecting unit configured to select a video scene from the storage medium based on information of the external device found by the external device search unit; and a video reproducing unit configured to read the selected video scene from the storage medium using the access unit and reproduce the video scene.

18 Claims, 5 Drawing Sheets

VIDEO REPRODUCING APPARATUS, METHOD, AND COMPUTER READABLE MEDIUM

CROSS-REFERENCE TO RELATED APPLICATIONS

This application is based upon and claims the benefit of priority from the prior Japanese Patent Applications No. 2006-150316 filed on May 30, 2006, the entire contents of which are incorporated herein by reference.

BACKGROUND OF THE INVENTION

1. Field of the Invention

The present invention relates to a device and a method for reproducing a video, and, a computer readable medium.

2. Related Art

In recent years, video equipment, especially DVD (Digital Versatile Disc) and digital television, has significantly evolved. Additionally, development of home networks by networking of such equipment has rapidly progressed. Usage in which contents stored in a home server is viewed on a large television connected via a network by sending video information (signal) of the contents through the network is becoming common. Currently, as a standard for it, DLNA (Digital Living Network Alliance) is becoming popular.

On the other hand, various equipment which can be controlled from a network has been actively developed. Air conditioners and the like are its typical examples in the field of white goods. A technology in which a command is transferred onto a home network upon request from a controller (operating equipment) and a relevant device on the home network is controlled by this command has been actively developed. ECHONET™ is famous as its typical standard. It is anticipated that its target will cover equipment in various fields such as health care equipment and home robots in future.

There is expected here that a more advanced service by cooperation of devices is provided by controlling peripheral devices depending on a content of a video. In that case, according to a scheme which simply determines a peripheral device to be used depending on a device configuration at a time of reproduction and operates the peripheral device with a content JP-A 2005-50126 (Kokai)), the peripheral device to be used is simply determined on demand, and the content itself is statically designed and reproduced. In addition, as an example of cooperation of video information and peripheral devices via broadcast, there is a scheme which controls an air-conditioner, a lightning device, or the like depending on a content of a broadcast (JP-A 2001-333030 (Kokai)). Also in this, as with the above JP-A 2005-50126 (Kokai), a content itself is static, just the same video is reproduced regardless of the presence or absence of each peripheral device, and an added value based on cooperation of devices cannot be added to a video side.

SUMMARY OF THE INVENTION

According to an aspect of the present invention, there is provided a video reproducing apparatus, comprising:

an access unit configured to access a storage medium holding a plurality of video scenes;

an external device search unit configured to search for an external device which can communicate;

a scene selecting unit configured to select a video scene from the storage medium based on information of the external device found by the external device search unit; and a video reproducing unit configured to read the selected video scene from the storage medium using the access unit and reproduce the video scene.

According to an aspect of the present invention, there is provided a video reproducing method, comprising:

searching for an external device which can communicate with a video reproducing apparatus;

selecting a video scene from a storage medium holding a plurality of video scenes based on information of the external device found by the searching; and reading the selected video scene from the storage medium and reproducing the video scene in the video reproducing apparatus.

According to an aspect of the present invention, there is provided a computer readable medium storing a computer program for causing a computer to execute instructions to perform steps of:

searching for an external device which can communicate with the computer;

selecting a video scene from a storage medium holding a plurality of video scenes based on information of the external device found by the searching; and reading the selected video scene from the storage medium and reproducing the video scene.

DETAILED DESCRIPTION OF THE INVENTION

The present embodiment allows contents and peripheral devices to operate in cooperation while adaptively changing a content (representation) to be reproduced depending on a device environment in a periphery of a video reproducing apparatus.

Hereinafter, embodiments according to the present invention will be described in detail with reference to the drawings. The embodiments described below are not limited to the present invention.

Figure 1:
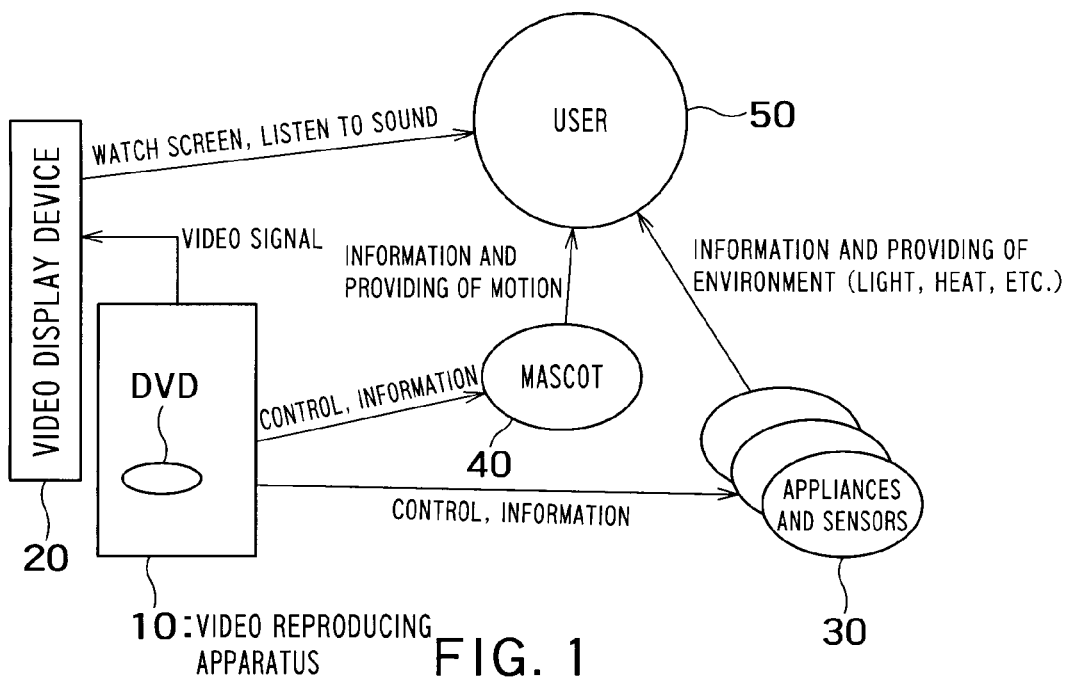
FIG. 1 is a schematic diagram which shows a use environment of a video reproducing apparatus according to an embodiment of the present invention.

FIG. 1 is a schematic diagram which shows a use environment of a video reproducing apparatus according to an embodiment of the present invention.

In the present embodiment, as a video reproducing apparatus 10, a video reproducing apparatus like a DVD (Digital Versatile Disc) player is assumed.

In a periphery of the video reproducing apparatus 10, a video display device 20, a consumer electronic device 30, and a mascot 40 are placed. The video reproducing apparatus 10 can communicate with the consumer electronic device 30 and the mascot 40 directly or through a network.

The video display device 20 is a TV, a projector, or the like. The video display device 20 receives video signals and sound signals from the video reproducing apparatus 10, and displays a video or a sound to a user 50. A function of the video reproducing apparatus 10 may be built inside the video display device 20.

The consumer electronic device 30 is a home appliance such as an air conditioner, a refrigerator, a television, a washing machine, and a microwave oven.

The mascot 40 is a home robot, a device of a character, or the like, and is a device for providing a user with information through a motion of its main body or a sound given from itself. Seen from a viewpoint of the video reproducing apparatus 10, the mascot 40 is included in the same category as the consumer electronic device 30.

Video information to be reproduced by the video reproducing apparatus 10 may be provided by a package medium such as a DVD (for example, HD-DVD), or may be stored in advance into a storage unit inside the video reproducing apparatus 10 though a communication or broadcast receiving means. These package medium and storage unit correspond to a storage medium. In the following description, the former one is used for the description.

Figure 3:
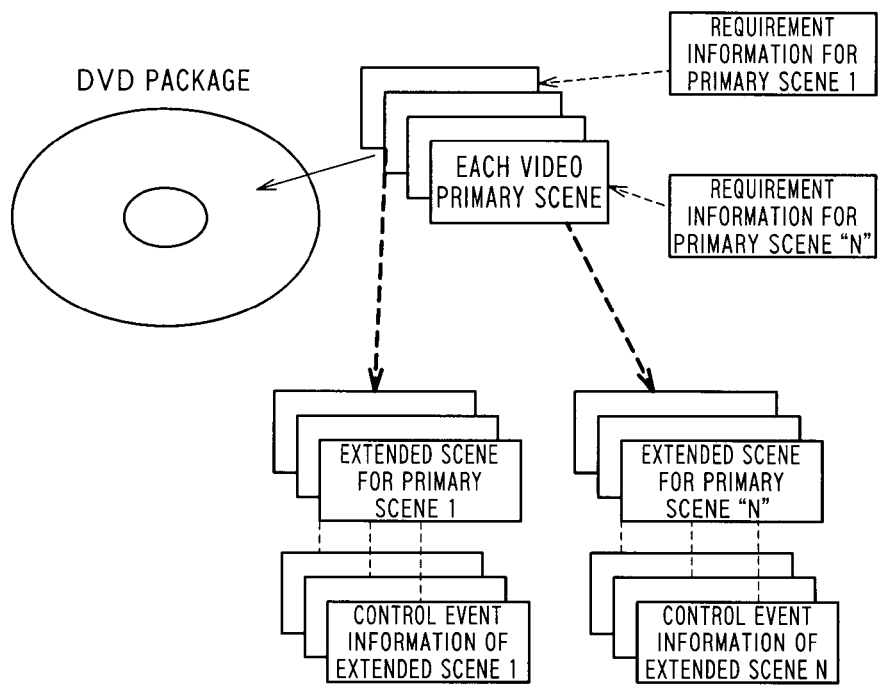
FIG. 3 is a diagram which shows an example of data stored in a DVD package.

An example of data stored in a DVD package is shown in FIG. 3. Original video information of the DVD is assumed as a primary video scene (hereinafter simply referred to as a primary scene) group. They are logically managed on a chapter basis. A unit of each primary scene is here assumed as a chapter unit of an application.

Each primary scene is associated with respective requirement information. In the requirement information, information of one or more extended video scene (hereinafter simply referred to as an extended scene) associated with a primary scene, conditions of an external device required for reproducing each extended scene (for example, a condition based on a device name, the number of the device, a device property, and the like. See FIG. 4 described later.), a control command group for controlling the external device, and an event group which can be received from the external device, and the like are described. Requirement information may be provided to all primary scenes or may be provided to only a part of primary scenes.

One or more extended scenes are associated with each primary scene as stated above and control event information (see FIG. 5 described later) is associated with an extended scene. All primary scenes may be associated with respective extended scenes or only a part of primary scenes may be associated with respective extended scenes.

When a DVD package is inserted into the video reproducing apparatus 10, requirement information associated with each primary scene is loaded into the device 10 in addition to video information of each primary scene. Here, a program for performing each step of a flowchart shown in FIG. 8 described later may be stored in the DVD package. This program is loaded into the video reproducing apparatus 10 and executed when the DVD package is inserted into the device 10 or if required.

After the DVD package is loaded or just before each primary scene is reproduced, the video reproducing apparatus 10 analyzes requirement information associated with the primary scene to be reproduced as well as searches for a peripheral device. Searching for a peripheral device is performed using, for example, UPnP (Universal Plug and Play) or the like, and collects information of the peripheral device. Such collected information is a device name (identification information), property information, and the like. For example, when UPnP is used, a device name, a manufacturer name, a serial number, and the like are obtained from a device description. From a service description, an action (control command) name supported by each service, a type of an augment for the action, and the like are obtained. The video reproducing apparatus 10 selects a video scene to be reproduced based on a result of collection and a result of analysis of requirement information. For example, an original primary scene, or an extended scene associated with a primary scene instead of the primary scene is selected (as described later in detail). The video reproducing apparatus 10 reproduces a video of the selected video scene.

Figure 2:
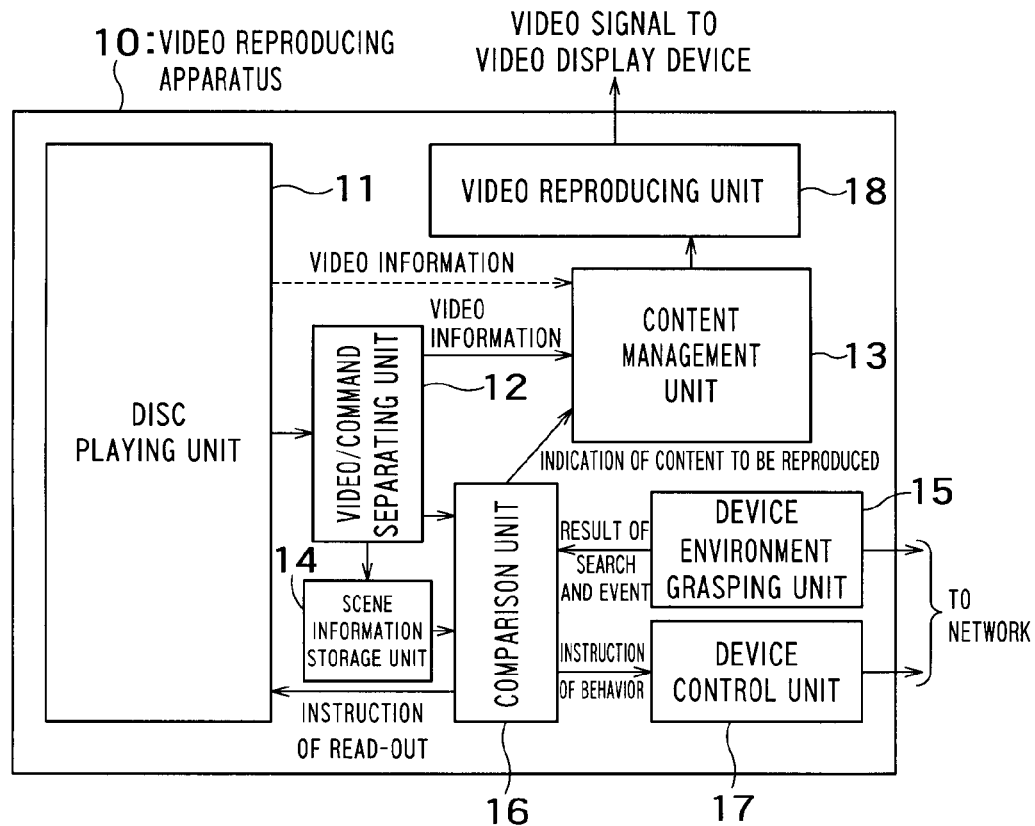
FIG. 2 is a diagram which shows an example of the video reproducing apparatus.

FIG. 2 shows an example of internal constitution of the video reproducing apparatus 10.

A disc playing unit (access unit) 11 reads out video information of a primary scene recorded in a DVD package and requirement information associated with the primary scene, and passes them to a video/command separating unit 12.

The video/command separating unit 12 separates video information of the primary scene from requirement information of the primary information, and passes the video information of the primary scene to a content management unit 13. Video information of a primary scene which does not have requirement information may be passed directly from the disc playing unit 11 to the content management unit 13 (see a dashed arrow). In addition, the video/command separating unit 12 analyzes the requirement information of the primary scene and stores an analysis result in a scene information storage unit 14.

A device environment grasping unit 15 searches for a peripheral device (an external device) at any time or a specified time, and inputs information of the device found by searching into a comparison unit 16. In addition, the device environment grasping unit 15 has a function which receives an event from each peripheral device or a user, and inputs information of the received event into the comparison part 16. The device environment grasping unit 15 corresponds to, for example, an external device search unit, a user event detection unit, and an external device event detector.

A device control unit 17 has a function which transmits a control command to each device according to an instruction from the comparison unit 16. The device control unit 17 is not necessarily required, and required only in a case that behavior of a device is concurrently controlled with video reproduction.

The comparison unit 16 selects a video scene (an original primary scene or an extended scene) to be reproduced based on requirement information associated with a primary scene just before reproduction and information of a peripheral device obtained by searching by the device environment grasping unit 15. The comparison unit 16 corresponds to, for example, a scene selecting unit. When the selected video scene is an extended scene, the comparison part 16 gives the disc playing unit 11 an instruction about read-out of video information of the extended scene and control event information associated with the extended scene.

When the instruction of read-out is given, the disc playing unit 11 reads out video information and control event information of the instructed extended scene from a DVD, and passes them to the video/command separating unit 12.

The video/command separating unit 12 inputs the passed video information of the extended scene into the content management unit 13, and analyzes the control event information and stores an analysis result in the scene information storage unit 14.

In addition, the comparison result 16 gives the content management unit 13 an instruction of reproduction of the selected video scene (primary scene or extended scene).

The content management unit 13 selects the video scene instructed from the comparison 16, and passes video information of the selected video scene to a video reproducing unit 18.

The video reproducing unit 18 generates video signals from the video information passed from the content management unit 13, and inputs them to the video display device 20.

Figure 4:
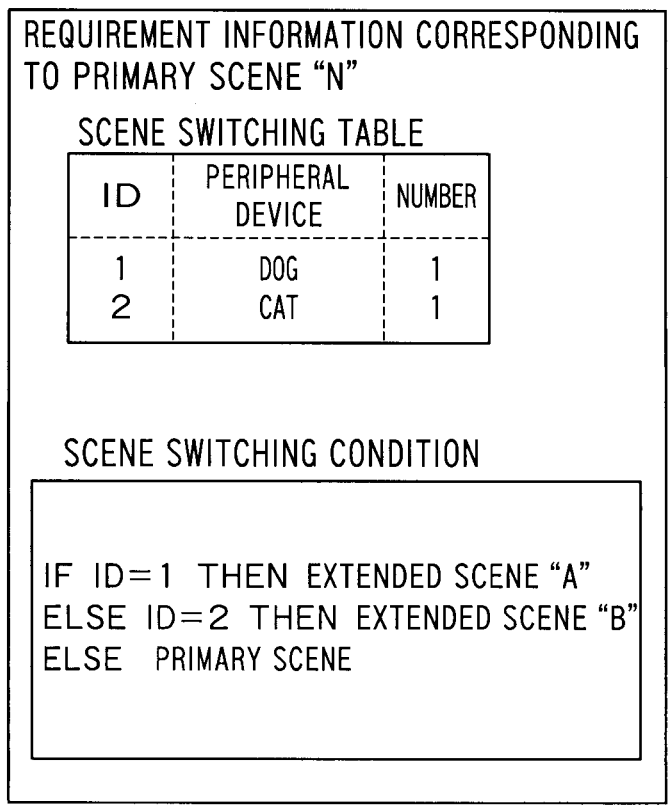
FIG. 4 is a diagram which shows an example of requirement information associated with a primary scene.

FIG. 4 shows an example of requirement information with respect to a primary scene (a primary scene "N" is an example as used herein).

In the present example, a type of device and the number of devices which are required for reproducing each of extended scenes "A" and "B" that are prepared for the primary scene "N", and a method for selecting a video scene to be reproduced (a method for selecting a scene to be reproduced from the primary scene "N" and the extended scenes "A" and "B") are defined by a scene switching table and a scene switching condition. In the present example, it is illustrated that the extended scene "A" is reproduced if one dog device is found by just before reproduction of the primary scene "N", the extended scene "B" is reproduced if one cat device is found, and the original primary scene "N" is reproduced if neither is found.

Figure 5:
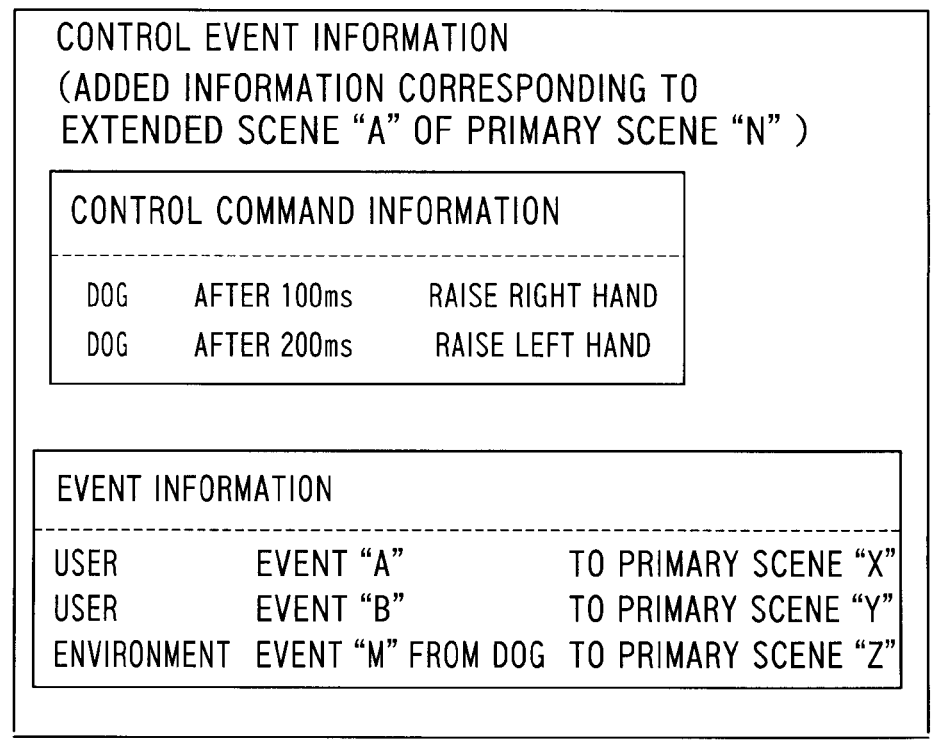
FIG. 5 is a diagram which shows an example of control event information associated with an extended scene "A"

FIG. 5 shows an example of control event information associated with the extended scene "A".

In the control event information, control command information and event information are contained.

The control event information describes which command is issued to a target device at which timing. In the present example, it is illustrated that a control command to raise a right hand and a control command to raise a left hand are issued at a timing of 100 ms after start of the extended scene "A" and at a timing of 200 ms after start of the extended scene "A" to the dog device respectively.

In the event information, a category name of an event received by the video reproducing apparatus 10, a type of the event, and information of a primary (or extended) scene to which transition is made after the event is received are described. In the present example, it is illustrated that, if an event "A" (event type) is received from a user (category name) during reproduction of the extended scene "A", transition to a primary scene "X" is immediately made and the primary scene is reproduced. Similarly, it is illustrated that transition to a primary scene "Y" is made if the video reproducing apparatus 10 receives an event "B" from a user during reproduction of the extended scene "A", and transition to a primary scene "Z" is made if the video reproducing apparatus 10 receives an event (an event from the dog "M") from an environment (a peripheral device).

An operation example of the video reproducing apparatus 10 will next be described.

Figure 6:
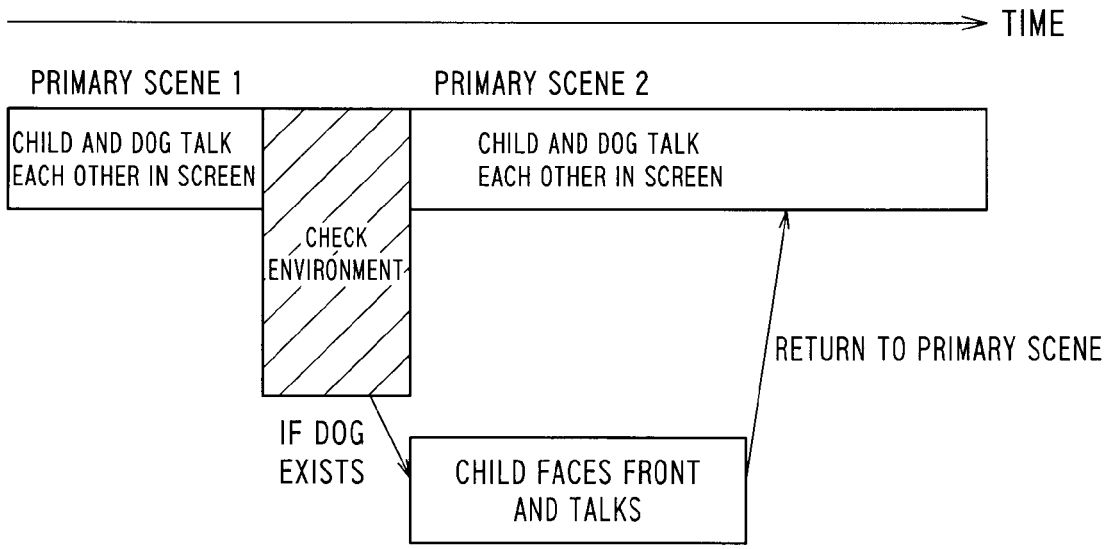
FIG. 6 is a diagram which illustrates in detail an example in which an extended scene is reproduced instead of an original primary scene.

FIG. 6 is a diagram which illustrates in detail an example in which an extended scene is reproduced instead of an original primary scene.

In a situation in which the video reproducing apparatus 10 is reproducing a primary scene 1 (a scene where a child and a dog talk to each other in a screen of the video display device 20), the video reproducing apparatus 10 checks a device environment in a periphery of the video reproducing apparatus 10 (searches for a peripheral device) at a time when the scene is to be switched (the primary scene 1 is terminated). If there is no external device in the periphery, the video reproducing apparatus 10 continuously reproduces a primary scene 2 where the child and the dog talk to each other.

On the other hand, if the dog mascot 40 is found as a result of checking of the device environment in the periphery, the video reproducing apparatus 10 provides an extended scene to a user through the video display device 20. In the extended scene, for example, the dog is not displayed in the screen, and the child in the screen faces the front of a television and plays with the dog outside the screen (the dog mascot 40). In addition, according to a function built in the dog mascot 40 or as needed, the video reproducing apparatus 10 issues a control command to perform a behavior action to the dog mascot 40. A content and an issue timing of the control command are described in the control event information described above (see FIG. 5). Thereby, the child in the screen and the dog mascot 40 outside the screen operate in cooperation. If a position information of the dog mascot 40 relative to the video reproducing apparatus 10 or the video display device 20 is obtained on-line or off-line when a device environment in a periphery is checked, or if position measurement is allowed using an infrared position measuring device connected to the video reproducing apparatus 10, an extended scene to be reproduced may be adaptively changed according to a position of the dog mascot 40. For example, when the dog is in the center of the screen, an extended scene where the child faces the front and talks is reproduced, and, when the dog is in the right side, an extended scene where the child faces to the right is reproduced. Such adaptive changing of video scenes is performed based on, for example, the scene changing condition described in the requirement information illustrated in FIG. 4.

Figure 7:
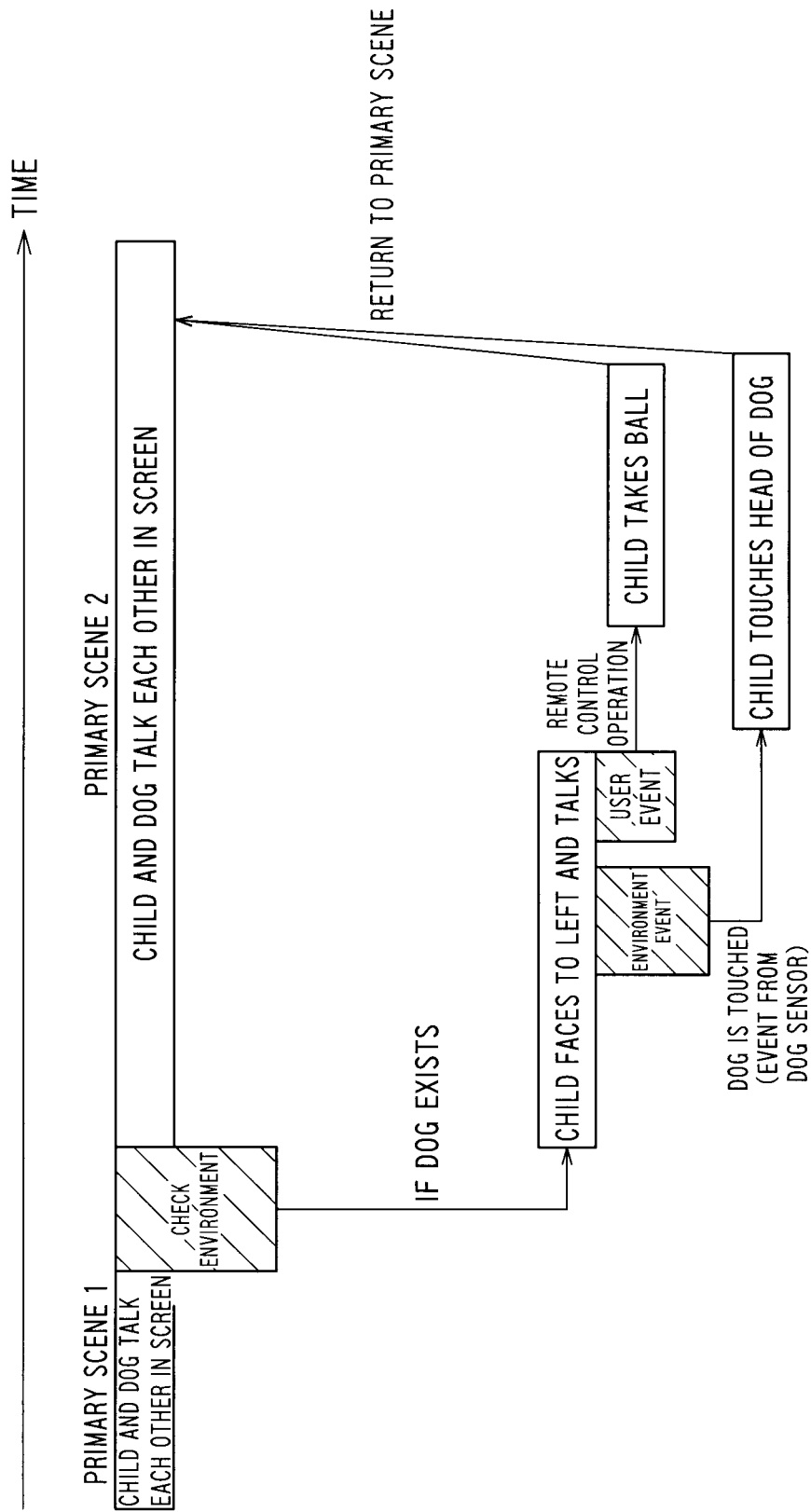
FIG. 7 is a diagram which illustrates an example in which transition to another extended scene is performed during reproduction of one extended scene.

FIG. 7 is a diagram which illustrates an example in which transition to another extended scene is performed during reproduction of one extended scene.

At a time when the scene is to be switched during reproduction of the primary scene 1 (the scene where the child and the dog talk to each other in a screen), the video reproducing apparatus 10 checks a device environment in a periphery (searches for a peripheral device). If there is no external device in the periphery, the primary scene 2 where the child and the dog talk to each other in the screen is continuously reproduced.

On the other hand, if the dog mascot 40 is found as a result of checking of the device environment in the periphery, the video reproducing apparatus 10 provides an extended scene to a user 50 through the video display device 20. In the extended scene, for example, the dog is not displayed, and the child faces the front of a television and plays with the dog outside the screen. In addition, according to a function built in the dog mascot 40 or as needed, a control command to control a behavior action is issued to the dog mascot 40. Thereby, the child in the screen and the dog mascot 40 operate in cooperation.

Then, at any time within an extended scene or a primary scene, if the video reproducing apparatus 10 receives a user event directly or through a network, or receives an environment event issued by a sensor of an external device (the dog mascot 40 in the present example) directly or through the network, the video reproducing apparatus 10 performs the following operation. In an example of an extended scene, a current extended scene is switched to a suitable extended scene based on an event received during reproduction of the extended scene and control event information of the current extended scene, and issue of a control command is started based on control event information of the extended scene after switching. In the present example, when the user 50 sends an instruction to touch a ball in the screen by remote control during reproduction of an extended scene where the child faces the front of the screen and talks, the current video scene is quickly switched to a scene where the child takes the ball as shown in FIG. 7. In a similar way, when the user 50 touches the head of the dog mascot 40 in which a sensor is mounted, sensor information is fed back to the video reproducing apparatus 10, and a current video scene is quickly switched to an extended scene where the child touches the head of the dog outside the screen (the dog mascot 40).

Figure 8:
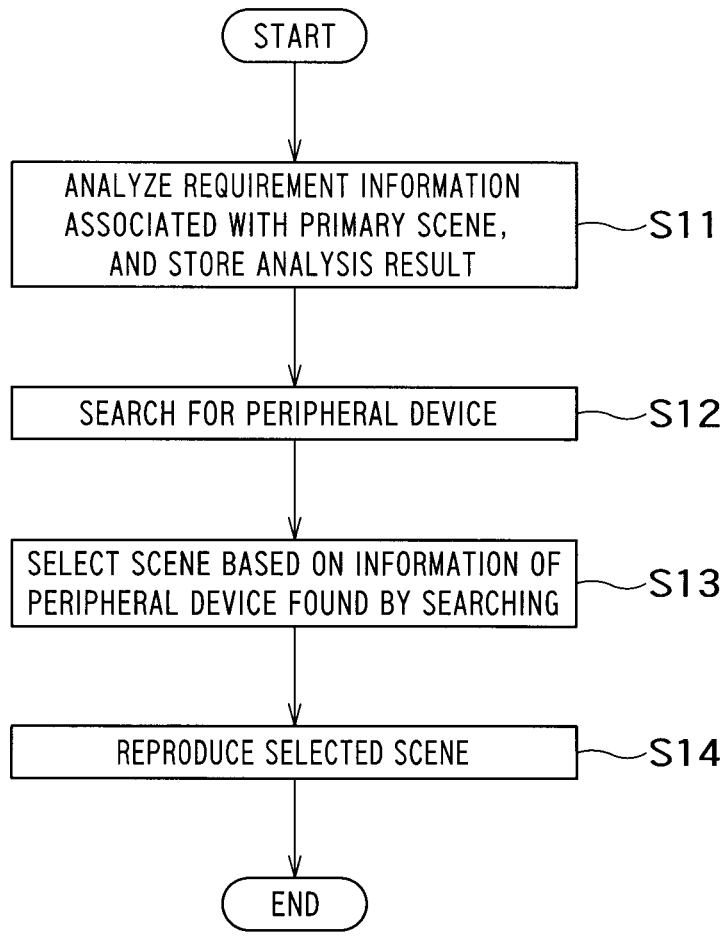
FIG. 8 is a flowchart which illustrates a flow of an embodiment of a method of the present invention.

FIG. 8 is a flowchart which illustrates a flow of an embodiment of a method of the present invention.

The video/command separating unit 12 analyzes requirement information associated with each primary scene and stores an analysis result in the scene information storage unit 14 (S11).

The device environment grasping unit 15 in the video reproducing apparatus 10 searches for a peripheral device, and gives information of the peripheral device found by searching to the comparison unit 16 (S12).

The comparison unit 16 selects a video scene (a primary scene or an extended scene) to be reproduced based on requirement information associated with a primary scene to be next reproduced and information of a peripheral device found by searching which is given from the device environment grasping unit 15, and instructs reproduction of the selected video scene to the content management unit 13 (S13).

The content management unit 13 passes video information of the instructed scene to the video playing unit 18, and the video playing unit 18 generates video signals from the passed video information and inputs them to the video display device 20 (S14).

As described above, according to the embodiment of the present invention, fine video representations depending on a device environment and a user preference is allowed even with respect to a video content of a same context, and a wide variety of representations are allowed by combination of a video and an external device. For example, in a case that a certain external device is used, a suitable content can be reproduced according to the presence or absence of the external device, and further a special added content, a video from a particular angle, or the like can be enjoyed, so that an added value of a video can be increased. In addition, diversifying household appliance environments and individual adaptations can be supported by dynamic integration of real devices and virtual contents.

What is claimed is:

1. A video reproducing apparatus, comprising:
   an access unit configured to access a storage medium holding a primary video scene and an extended video scene to be reproduced instead of the primary video scene, wherein the primary video scene is associated with the extended video scene;
   an external device search unit configured to search for an external device which can communicate with the video reproducing apparatus and to autonomously collect, without a user instruction, a condition of the external device required for the external device to reproduce the extended video scene found by searching, from the external device;
   a scene selecting unit configured to (i) select the primary video scene when the condition of the external device required for the external device to reproduce the extended video scene found by the searching does not meet a predetermined condition and to (ii) select the extended video scene associated with the primary video scene when the condition of the external device required for the external device to reproduce the extended video scene meets the predetermined condition; and
   a video reproducing unit configured to read the primary video scene or the extended video scene selected by the scene selecting unit from the storage medium via the access unit and to reproduce the primary video scene or the extended video scene.

2. The apparatus according to claim 1, wherein the predetermined condition is a condition based on the information of the external device.

3. The apparatus according to claim 1, further comprising a device control unit configured to transmit a control command prepared in advance correspondingly to the selected primary video scene or the selected extended video scene to the external device.

4. The apparatus according to claim 1, further comprising a user event detection unit configured to detect a user event input from a user;
   wherein the storage medium stores event video scenes;
   the scene selecting unit selects one of the event video scenes based on a content of the user event and the primary video scene or the extended video scene being reproduced; and
   wherein the video reproducing unit switches the primary video scene or the extended video scene being reproduced to the event video scene selected by the scene selecting unit.

5. The apparatus according to claim 4, wherein the scene selecting unit selects the event video scene by using event information previously given with respect to the primary video scene or the extended video scene being reproduced wherein the event information associates contents of a user event with event video scenes.

6. The apparatus according to claim 1, further comprising:
   an external device event detector configured to detect an event that has occurred in the external device;
   wherein
   the storage medium stores event video scenes;
   the scene selecting unit selects one of the event video scenes based on a content of the detected event and the primary video scene or the extended video scene being reproduced; and
   wherein the video reproducing unit switches the primary video scene or the extended video scene being reproduced to the event video scene selected by the scene selecting unit.

7. The apparatus according to claim 6, wherein the scene selecting unit selects the event video scene by using event information previously given with respect to the primary video scene or the extended video scene being reproduced, wherein the event information associates contents of an event with event video scenes.

8. The apparatus according to claim 1, wherein
   the information concerning the external device includes information for identifying the external device.

9. The apparatus according to claim 8, wherein
   the information for identifying the external device includes identification information of the external device or a type information of the external device.

10. The apparatus according to claim 8, wherein
    the information concerning the external device further includes property information of the external device.

11. A video reproducing method, comprising:
    searching for an external device which can communicate with a video reproducing apparatus;
    autonomously collecting, without a user instruction, a condition of the external device required for the external device to reproduce an extended video scene found by the searching, from the external device;

accessing a storage medium holding a primary video scene and the extended video scene to be reproduced instead of the primary video scene, wherein the primary video scene is associated with the extended video scene;

(i) selecting the primary video scene when the condition of the external device required for the external device to reproduce the extended video scene found by the searching does not meet a predetermined condition and (ii) selecting the extended video scene associated with the primary video scene when the condition of the external device required for the external device to reproduce the extended video scene meets the predetermined condition; and reading the selected primary video scene or the selected extended video scene from the storage medium and reproducing the primary video scene or the extended video scene in the video reproducing apparatus.

12. The method according to claim 11,
wherein the predetermined condition is a condition based on the information of the external device.

13. The method according to claim 11, further comprising transmitting a control command prepared in advance correspondingly to the selected primary video scene or the selected extended video scene to the external device.

14. The method according to claim 11, further comprising detecting a user event input from a user;
wherein
the storage medium stores event video scenes;
the selecting includes selecting one of the event video scenes based on a content of the user event and the primary video scene or the extended video scene being reproduced; and
wherein the reproducing includes switching the primary video scene or the extended video scene being reproduced to the event video scene.

15. The method according to claim 14, wherein the selecting includes selecting the event video scene by using event information previously given with respect to the primary video scene or the extended video scene, wherein the event information associates contents of a user event with event video scenes.

16. The method according to claim 11, further comprising:
detecting an event that has occurred in the external device, wherein
the storage medium stores event video scenes,
the selecting includes selecting one of the event video scenes based on a content of the detected event and the primary video scene or the extended video scene being reproduced; and
wherein the reproducing includes switching the primary video scene or the extended video scene being reproduced to the event video scene.

17. The method according to claim 16, wherein the selecting includes selecting the event video scene by using event information previously given with respect to the primary video scene or the extended video scene being reproduced, wherein the event information associates contents of an event with event video scenes.

18. A non-transitory computer readable medium storing a computer program for causing a computer to execute instructions to perform:
searching for an external device which can communicate with the computer;
autonomously collecting, without a user instruction, a condition of the external device required for the external device to reproduce an extended video scene found by the searching, from the external device;
accessing a storage medium holding a primary video scene and the extended video scene to be reproduced instead of the primary video scene wherein the primary video scene is associated with the extended video scene;
selecting the primary video scene when the condition of the external device required for the external device to reproduce the extended video scene found by the searching does not meet a predetermined condition and (ii) selecting the extended video scene associated with the primary video scene when the condition of the external device required for the external device to reproduce the extended video scene meets the predetermined condition; and
reading the selected primary video scene or the selected extended video scene from the storage medium and reproducing the primary video scene or the extended video scene.

* * * * *